United States Patent
Lee et al.

(10) Patent No.: US 9,064,392 B2
(45) Date of Patent: Jun. 23, 2015

(54) METHOD AND SYSTEM FOR AWARENESS DETECTION

(71) Applicants: Verizon New Jersey Inc., Newark, NJ (US); Verizon Patent and Licensing Inc., Basking Ridge, NJ (US)

(72) Inventors: Woo Beum Lee, Basking Ridge, NJ (US); Michelle Felt, Randolph, NJ (US)

(73) Assignees: Verizon Patent and Licensing Inc., Basking Ridge, NJ (US); Verizon New Jersey Inc., Newark, NJ (US)

( * ) Notice: Subject to any disclaimer, the term of this patent is extended or adjusted under 35 U.S.C. 154(b) by 22 days.

(21) Appl. No.: 13/658,456

(22) Filed: Oct. 23, 2012

(65) Prior Publication Data

US 2014/0111336 A1     Apr. 24, 2014

(51) Int. Cl.
| | |
|---|---|
| G08B 21/00 | (2006.01) |
| G08B 13/00 | (2006.01) |
| G08B 13/18 | (2006.01) |
| G08B 13/08 | (2006.01) |
| G08G 5/00 | (2006.01) |
| H04R 5/00 | (2006.01) |
| H04R 29/00 | (2006.01) |
| H04R 25/00 | (2006.01) |
| G01V 1/00 | (2006.01) |
| G08B 13/16 | (2006.01) |
| G08B 21/02 | (2006.01) |
| H04M 1/725 | (2006.01) |
| G08B 15/00 | (2006.01) |

(52) U.S. Cl.
CPC .......... *G08B 13/1672* (2013.01); *G08B 15/004* (2013.01); *G08B 15/002* (2013.01); G08B 21/02 (2013.01); H04M 1/72536 (2013.01)

(58) Field of Classification Search
USPC .......................... 381/56; 340/539.17; 704/205
See application file for complete search history.

(56) References Cited

U.S. PATENT DOCUMENTS

| | | | |
|---|---|---|---|
| 2003/0097255 A1* | 5/2003 | Gordon | 704/205 |
| 2003/0117280 A1* | 6/2003 | Prehn | 340/540 |
| 2006/0066447 A1* | 3/2006 | Davenport et al. | 340/458 |
| 2008/0267416 A1* | 10/2008 | Goldstein et al. | 381/56 |
| 2009/0003621 A1* | 1/2009 | Greywall | 381/92 |
| 2009/0146799 A1* | 6/2009 | Goldstein et al. | 340/463 |
| 2009/0196431 A1* | 8/2009 | Gregg | 381/56 |
| 2010/0296676 A1* | 11/2010 | Fujita et al. | 381/119 |
| 2011/0210846 A1* | 9/2011 | Causey et al. | 340/539.17 |

* cited by examiner

*Primary Examiner* — Jennifer Mehmood
*Assistant Examiner* — Pameshanand Mahase

(57) ABSTRACT

A method may include receiving sensor data, the sensor data including at least one of sound or light; comparing, when the sensor data includes sound, the received sound with sound information included in one or more media files; comparing, when the sensor data includes light, the received light with one or more particular conditions; determining, based on comparing at least one of the received sound or the received light, if alert information should be provided, the alert information indicating a dangerous situation; and providing, when the alert information should be provided, the alert information indicating the dangerous situation.

20 Claims, 8 Drawing Sheets

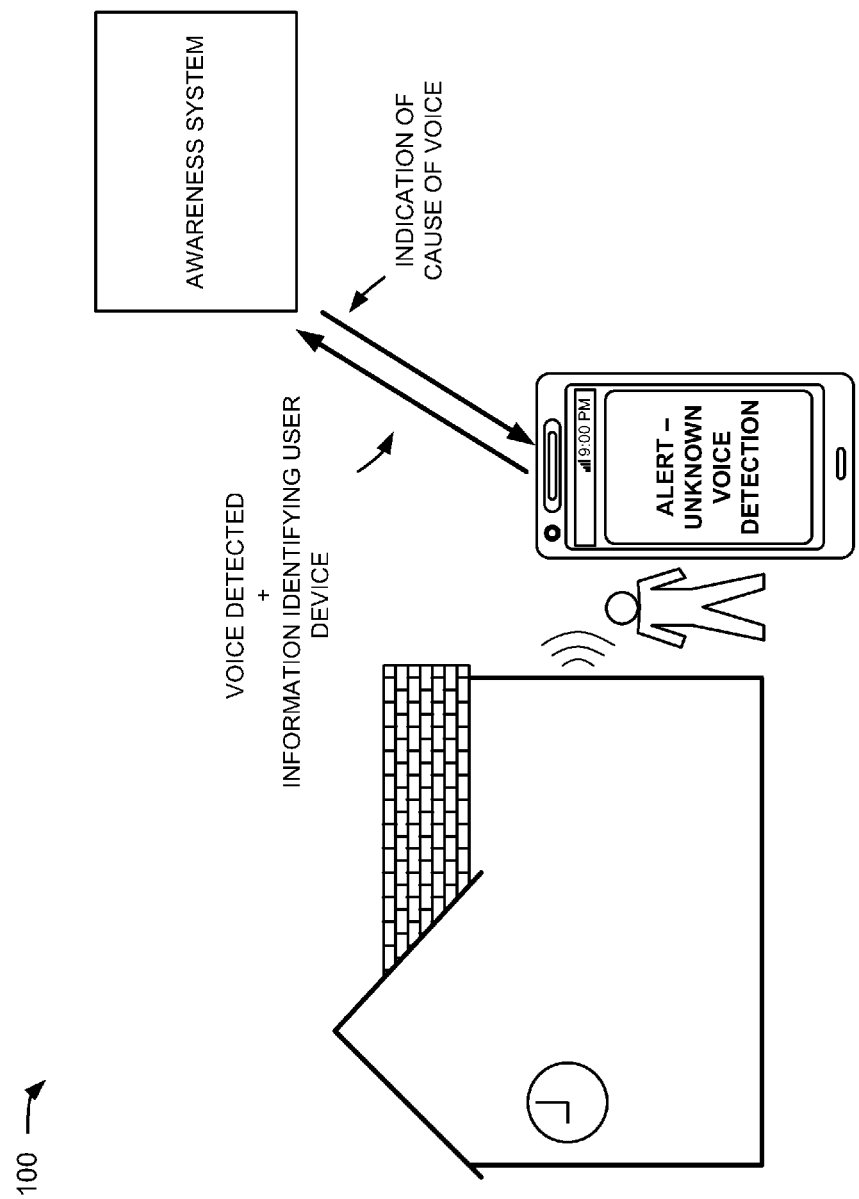

METHOD AND SYSTEM FOR AWARENESS DETECTION

BACKGROUND

Users sometimes use user devices to perform tasks, such as purchasing applications. Users may use their user devices to place and/or receive telephone calls, receive information from applications, and provide information to one or more other users. Users may also want personalized information and may use one or more applications to receive personalized information.

BRIEF DESCRIPTION OF THE DRAWINGS

FIGS. 1A-1C are diagrams illustrating an overview of an example implementation described herein;

DETAILED DESCRIPTION OF PREFERRED EMBODIMENTS

The following detailed description refers to the accompanying drawings. The same reference numbers in different drawings may identify the same or similar elements.

A system and/or method, as described herein, may provide an application to a user device that may be used to process information that is received by the user device. The information may include data relating to the user or the user device and/or sensor data relating to one or more conditions associated with the user device. In some implementations, the application may provide one or more alerts based on the sensor data to the user device that informs the user of the user device of the one or more conditions associated with the user device.

Figure 1A:
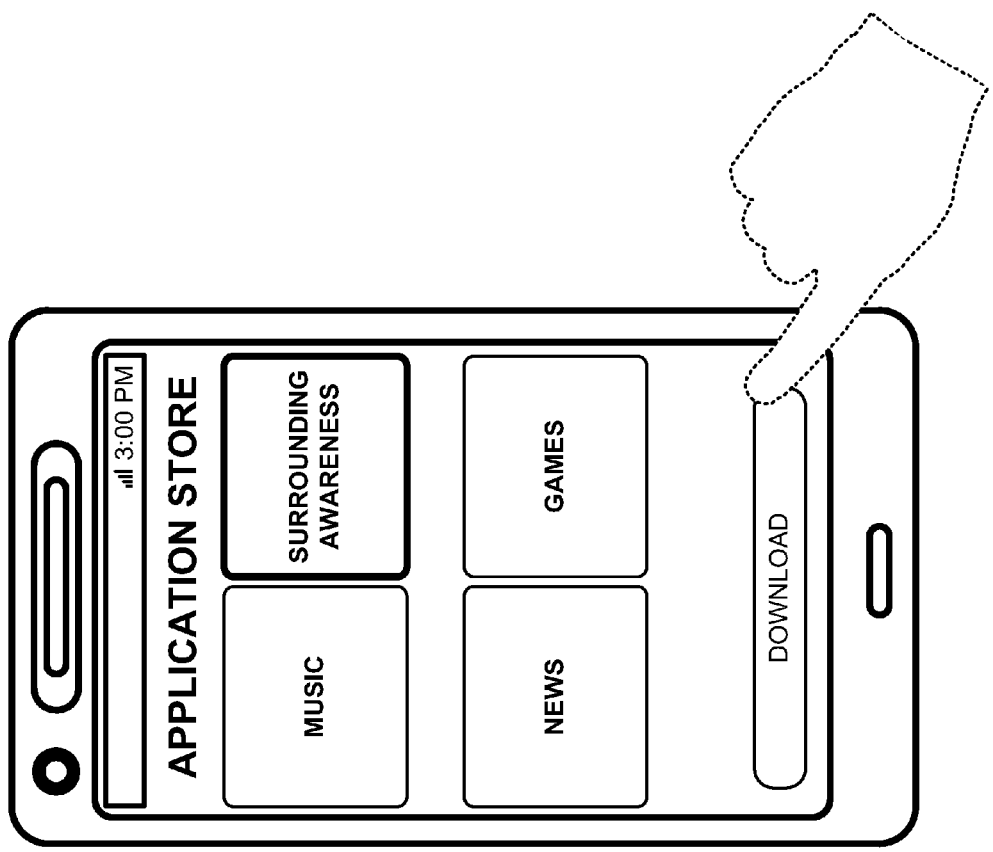
Figure 1B:
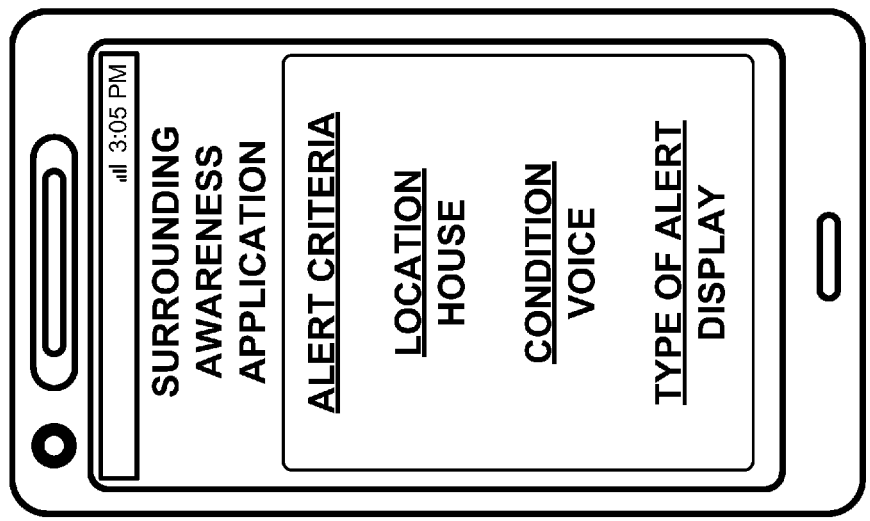

FIGS. 1A-1C are diagrams illustrating an overview 100 of an example implementation described herein. With reference to FIG. 1A, assume a user, of a user device, accesses an application store, which provides applications for download. The user may identify an application, named "Surrounding Awareness," that the user desires to download. This application may detect sound and light and notify the user of possible dangers in the vicinity of the user. Thus, as shown in FIG. 1A, the user may select a DOWNLOAD button to download the "Surrounding Awareness" application to the user device.

After downloading the "Surrounding Awareness" application, the user may provide user information to the "Surrounding Awareness" application. With reference to FIG. 1B, the user may provide information, associated with alert criteria, to the "Surrounding Awareness" application. For example, assume that the user wants to be alerted if, when approaching his/her house, a strange voice is detected within the house. Thus, the user may provide location information corresponding to the user's house, condition information corresponding to an occurrence of voice inside the user's house, and alert information corresponding to a type of alert that the "Surrounding Awareness" application should provide to the user device if a voice is detected inside the user's house. In overview 100, assume that the user indicates a desire for a visual alert that is displayed by the user device.

The "Surrounding Awareness" application may register this information provided by the user as part of user profile data. The "Surrounding Awareness" application may store this information locally on the user device and/or provide this information to an awareness system.

The user device may capture sensor data, using the "Surrounding Awareness" application, and provide this sensor data to the awareness system. In addition, the user device may transmit, using the "Surrounding Awareness" application, a user device identifier to the awareness system. Assume, as shown in FIG. 1C, that the user is at or approaching the user's house and wants to know if a voice is detected inside the user's house. The user may activate the "Surrounding Awareness" application, and the "Surrounding Awareness" application may cause sounds to be captured (e.g., by a microphone of the user device and/or from one or more devices within the house).

The "Surrounding Awareness" application may analyze the captured sounds to determine whether a voice is present. If the "Surrounding Awareness" application detects the occurrence of a voice inside the user's house, the "Surrounding Awareness" application may transmit the captured sound (or only that part of the captured sound that includes a voice), indicating detected voice, and the user device identifier to the awareness system.

Based on the received sound and the user device identifier, the awareness system may determine whether the received sound is a known sound. For example, in some situations, the user may send voice samples of family members, friends, etc. to the "Surrounding Awareness" application, and the "Surrounding Awareness" application may store the voice samples and transmit the voice samples to the awareness system. Thus, the awareness system may access the stored voice samples and compare the received sound with the stored voice samples. Assume that the user lives with a relative. The user may provide voice information, associated with the relative, to the "Surrounding Awareness" application as part of the user's configuration of the "Surrounding Awareness" application. The "Surrounding Awareness" application may transmit this voice information associated with the relative and the user device identifier to the awareness system, and the awareness system may associate this voice information with the user device identifier.

The awareness system may compare the received sound to the stored voice information to determine if a match exists. If the voice in the received sound matches the stored voice information, the awareness system may determine that the received sound (or only that part of the captured sound that includes a voice) is associated with the relative. Therefore, no alert may be needed. However, if the voice in the received sound does not match the stored voice information, the awareness system may transmit, to the "Surrounding Awareness" application, information indicating the occurrence of an unknown voice inside the user's house. Based on the transmitted information, the "Surrounding Awareness" application may provide an indication that an unknown voice has been detected. As illustrated in FIG. 1C, this indication may be displayed on the user device.

Figure 2:
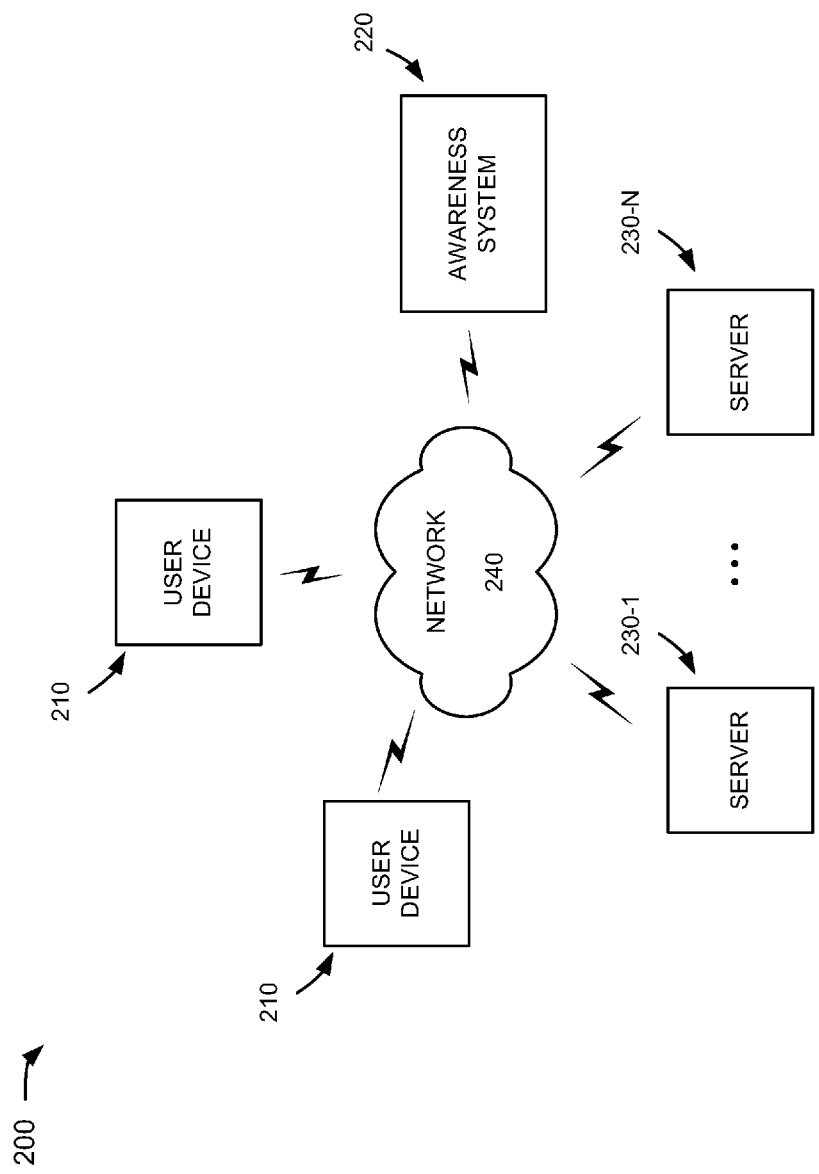
FIG. 2 is a diagram of an example environment in which systems and/or methods described herein may be implemented.

FIG. 2 is a diagram of an example environment 200 in which systems and/or methods described herein may be implemented. Environment 200 may include a group of user devices 210 connected to an awareness system 220, and multiple servers 230-1 through 230-N (where N>1) (referred to collectively as "servers 230" and, at times, individually, as "server 230") via a network 240.

User device 210 may include a client device, or a collection of client devices, that is capable of providing information. Examples of user device 210 may include a smart phone, a personal digital assistant, a laptop, a tablet computer, a camera, a personal computer, a gaming device, and/or another type of device with the ability to provide information. In some implementations, user device 210 may include a browser via which an application may be presented on a display associated with user device 210.

Awareness system 220 may include a server device or a collection of server devices which may be co-located or remotely located. Awareness system 220 may receive information from user device 210, identify a potential event based on the received information, and provide an alert based on the identified event. In addition, awareness system 220 may provide one or more user interfaces, to user device 210, to allow a user, of user device 210, to download an application, such as the "Surrounding Awareness" application and register information, associated with the user, with the "Surrounding Awareness" application.

Awareness system 220 may store a library of files. For example, awareness system 220 may store media files that relate to sounds that may be captured by user device 210. The sounds may include, for example, a dog bark, a voice of a friend, and a voice of a relative. Awareness system 220 may also receive, from user device 210, an identifier of user device 210 and one or more media files including, for example, sounds, pictures, and/or videos. Awareness system 220 may associate the identifier and the one or more media files in the library of files associated with user device 210. In some implementations, awareness system 220 may also receive one or more other media files, from one or more other user devices that are associated with user device 210, and associate the one or more other media files with the identifier in the library of files.

Server 230 may include a server device or a collection of server devices that may be co-located or remotely located. Any two or more of servers 230 may be implemented within a single, common server device or a single, common collection of server devices. Servers 230 may host documents, such as applications. In some implementations, one or more of servers 230 may be affiliated with a same entity (e.g., party, organization, business, company, etc.) as awareness system 220. In some implementations, none of servers 230 may be affiliated with the same entity as awareness system 220.

While awareness system 220 is shown as separate from servers 230, it may be possible for awareness system 220 to perform one or more of the functions described as being performed by a server 230 and/or a server 230 to perform one or more of the functions described as being performed by awareness system 220. For example, awareness system 220 may host the "Surrounding Awareness" application. Additionally, or alternatively, a user device 210 may host the "Surrounding Awareness" application and/or may perform one or more of the functions of awareness system 220.

Network 240 may include any type of network, such as, for example, a local area network ("LAN"), a wide area network ("WAN"), a telephone network, such as the Public Switched Telephone Network ("PSTN") or a cellular network, an intranet, the Internet, or a combination of these or other types of networks. User device 210, awareness system 220, and servers 230 may connect to network 240 via wired and/or wireless connections. In other words, any one of user device 210, awareness system 220, and/or servers 230 may connect to network 240 via a wired connection, a wireless connection, or a combination of a wired connection and a wireless connection.

Although FIG. 2 shows example components of environment 200, in some implementations, environment 200 may include additional components, fewer components, different components, or differently arranged components than those depicted in FIG. 2. Additionally, or alternatively, one or more components of environment 200 may perform one or more tasks described as being performed by one or more other components of environment 200.

Figure 3:
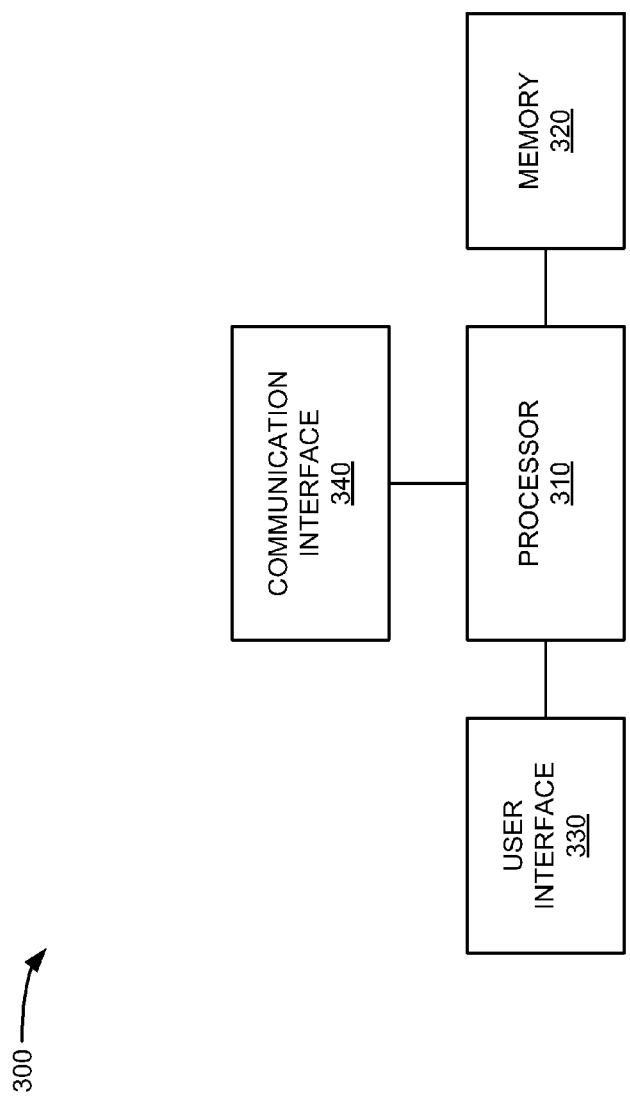
FIG. 3 depicts a diagram of example components of a device of FIG. 2.

FIG. 3 is a diagram of example components of a device 300. Device 300 may correspond to user device 210 and/or awareness system 220. As shown in FIG. 3, device 300 may include a processor 310, a memory 320, a user interface 330, and/or a communication interface 340. Processor 310 may include one or more microprocessors, application specific integrated circuits (ASICs), field programmable gate arrays (FPGAs), or the like. Processor 310 may control operation of device 300 and its components.

Memory 320 may include a random access memory (RAM), a read-only memory (ROM), and/or another type of memory to store data and instructions that may be used by processor 310. In one implementation, memory 320 may store data used to display a graphical user interface.

User interface 330 may include mechanisms for inputting information to device 300 and/or for outputting information from device 300. Examples of input and output mechanisms might include buttons, a speaker to receive electrical signals and output audio signals, a microphone to receive audio signals and output electrical signals, a display to receive touch input and/or to output visual information, a vibrator to cause device 300 to vibrate, and/or a camera to receive video and/or images.

Communication interface 340 may include, for example, a transmitter that may convert baseband signals from processor 310 to radio frequency (RF) signals and/or a receiver that may convert RF signals to baseband signals. Alternatively, communication interface 340 may include a transceiver to perform functions of both a transmitter and a receiver.

As will be described in detail below, device 300 may perform certain operations described herein based on processor 310 executing software instructions of an application contained in a computer-readable medium, such as memory 320. A computer-readable medium may be defined as a physical or logical memory device. A logical memory device may include a space within a single physical memory device or spread across multiple physical memory devices. The software instructions may be read into memory 320 from another computer-readable medium or from another device via communication interface 340. The software instructions contained in memory 320 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may contain fewer, different, differently arranged, or additional components than depicted in FIG. 3. In some implementations, a component of device 300 may perform one or more tasks described as being performed by another component of device 300.

Figure 4:
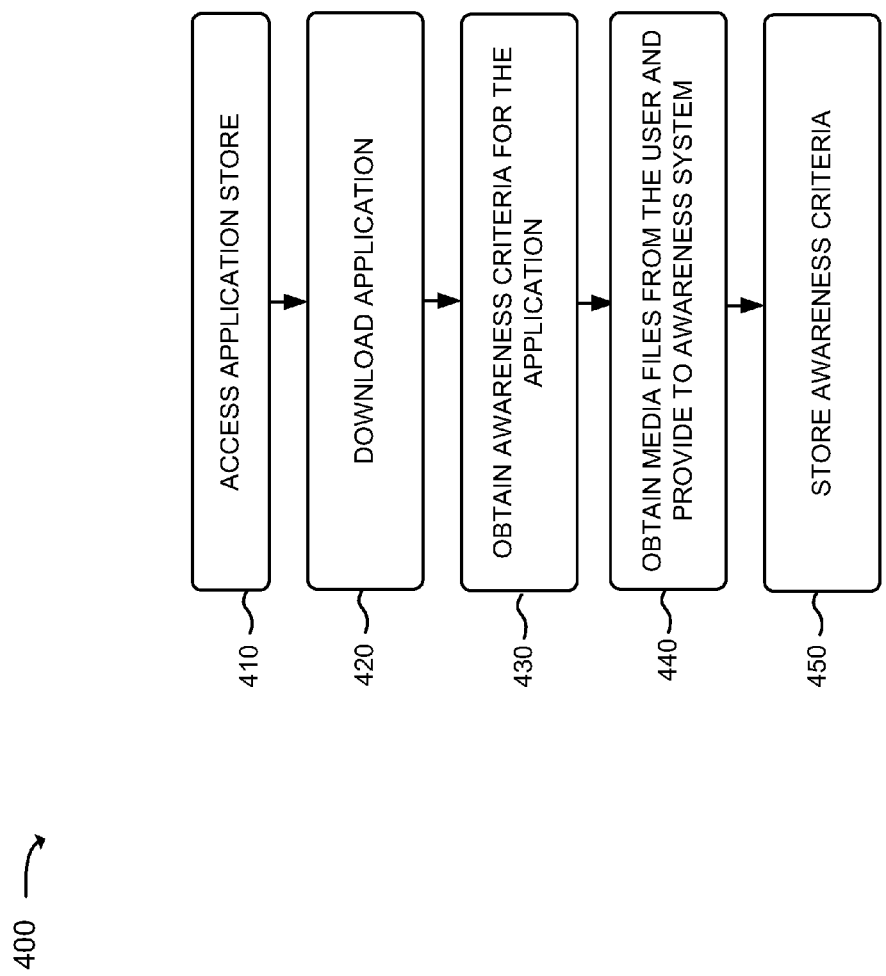
FIG. 4 is a flowchart of an example process relating to downloading an application.

FIG. 4 is a flowchart of an example process 400 relating to downloading an application. In some implementations, process 400 may be performed by user device 210. In some implementations, one or more blocks of process 400 may be performed by one or more devices instead of, or possibly in conjunction with, user device 210.

Process 400 may include accessing an application store (block 410). For example, user device 210 may access an application store, which provides information regarding applications that may be downloaded. In some implementations, a user may access the application store via, for example, a browser or in another manner.

Process 400 may include downloading an application (block 420). For example, the user of user device 210 may review the applications associated with the application store. Upon identifying an application of interest, such as the "Surrounding Awareness" application, the user may cause user device 210 to download the application. In some implementations, user device 210 may download the application from awareness system 220. In some implementations, user device 210 may download the application from another system or device. In some implementations, user device 210 may come pre-installed with the application. Therefore, the user may have access to the application without downloading the application. In some implementations, the application may come with a library of known sounds, such as breaking glass, a door opening and/or closing, a dog bark, a car engine, etc.

Process 400 may include obtaining awareness criteria for the application (block 430). The awareness criteria may include criteria that identifies the type of sensor data that is to be captured and/or the manner in which user device 210 is to provide an alert. The awareness criteria may also identify when user device 210 is to capture the identified type of sensor data. In some implementations, the list of awareness criteria may include awareness criteria that have been provided by a designer of the application. In some implementations, the user of user device 210 may choose to accept the list of awareness criteria or modify one or more of the awareness criteria in the list by, for example, adding one or more awareness criteria, removing one or more awareness criteria, or altering one or more awareness criteria in the list. User device 210 may obtain the awareness criteria in other ways.

Figure 5:
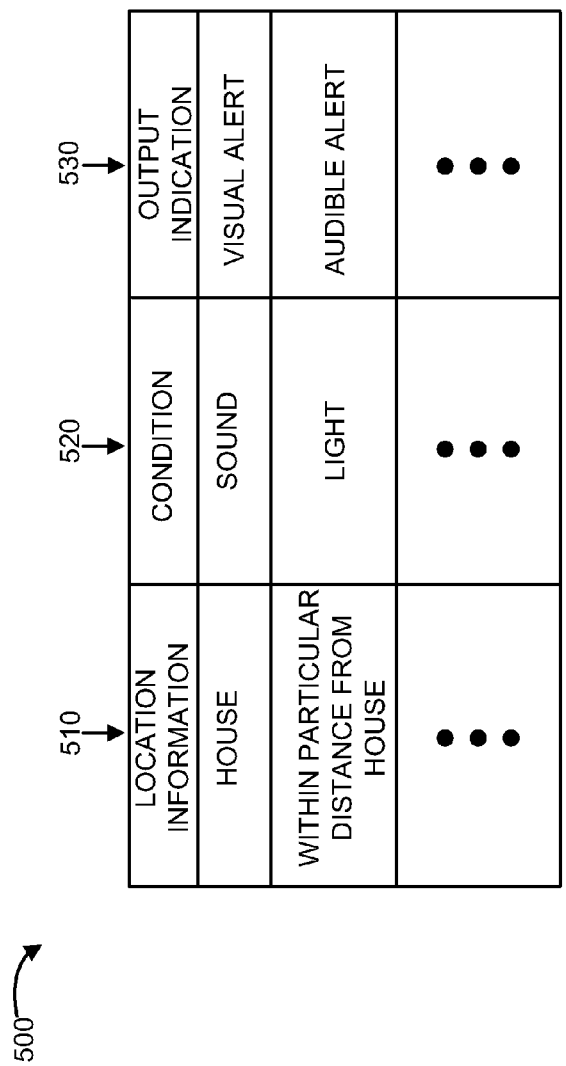
FIG. 5 depicts an example data structure.

FIG. 5 illustrates an example data structure 500 that may be stored by one or more devices, such as user device 210, awareness system 220, and/or server 230. In some implementations, data structure 500 may be stored in a memory separate from, but accessible by, user device 210, awareness system 220, and/or server 230. Each entry associated with data structure 500 may correspond to one or more particular functions, which may be performed based on certain conditions.

As shown in FIG. 5, data structure 500 may include a location field 510, a condition field 520, and an output field 530.

Location field 510 may store information identifying geographic locations. The information may be stored as Global Positioning System (GPS) coordinates, latitude/longitude coordinates, a physical address, or in another manner.

Condition field 520 may include information identifying a particular type of sensor data. Examples of sensor data types may include sound and light. Sound may be, for example, voice, sound above a particular decibel level, a particular type of sound, etc. Light may be, for example, a particular quantity of light, a change in a particular quantity of light, etc.

Output indication field 530 may include information identifying a particular manner in which a user may be alerted to a condition. Examples of the ways a user may be alerted include a visual alert, an audible alert, a physical alert (e.g., an alert that causes user device 210 to vibrate), and/or a combination of one or more of a visual alert, an audible alert, or a physical alert. In some implementations, output indication field 530 may store information indicating that a telephone call is to be placed (e.g., to a family member, a friend, etc.) or a text message or another type of message is to be sent.

As an example, if the user of user device 210 turns on the "Surrounding Awareness" application, the "Surrounding Awareness" application may determine, based on Global Positioning System (GPS) coordinates, latitude/longitude coordinates, and/or a physical address, that user device 210 is located at or near the user's house. Based on this determination, the "Surrounding Awareness" application may determine that the condition field associated with the user's house is sound and may cause user device 210 to begin capturing sound as the sensor data, as indicated by condition field 520. The "Surrounding Awareness" application may identify if the sensor data indicates that sound is occurring inside the user's house. If sound is occurring, the "Surrounding Awareness" application may provide information to cause user device 210 to display a visual alert, as indicated by output indication field 530.

In addition, if the user of user device 210 turns on the "Surrounding Awareness" application, the "Surrounding Awareness" application may determine, based on Global Positioning System (GPS) coordinates, latitude/longitude coordinates, and/or a physical address, that user device 210 is located away from the user's house but within a particular distance from the user's house. Based on this determination, the "Surrounding Awareness" application may determine that the condition field associated with this location is light and may cause user device 210 to begin capturing light as the sensor data, as indicated by condition field 520. The "Surrounding Awareness" application may identify if the sensor data indicates that a particular quantity of light and/or a change in a particular quantity of light is occurring in proximity to user device 210. If a particular quantity of light and/or a change in a particular quantity of light is occurring, the "Surrounding Awareness" application may provide information to cause user device 210 to provide an audible alert, as indicated by output indication field 530.

While data structure 500 is shown to include a particular quantity and arrangement of fields, the fields shown in FIG. 5 are for explanatory purposes only. In practice, data structure 500 may include additional fields, fewer fields, different fields, or differently arranged fields than are described with respect to data structure 500.

Returning to FIG. 4, process 400 may include obtaining media files from the user of user device 210 and providing the obtained media files to awareness system 220 (block 440). For example, the user may provide one or more media files including, for example, sounds, pictures, and/or videos to the application, and the application cause some or all of the one or more media files to be stored at user device 210 (e.g., in memory 320) and/or provide some or all of the one or more media files to awareness system 220. In some implementations, the user-provided one or more media files may be marked as dangerous or non-dangerous. For example, if the user has a restraining order against her husband, the user may provide the sound of his voice and provide information indicating that his voice is dangerous and an alert should be provided if his voice is detected.

Process 400 may include storing the awareness criteria for the application (block 450). For example, user device 210 may store the awareness criteria in a data structure, such as data structure 500.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Figure 6:
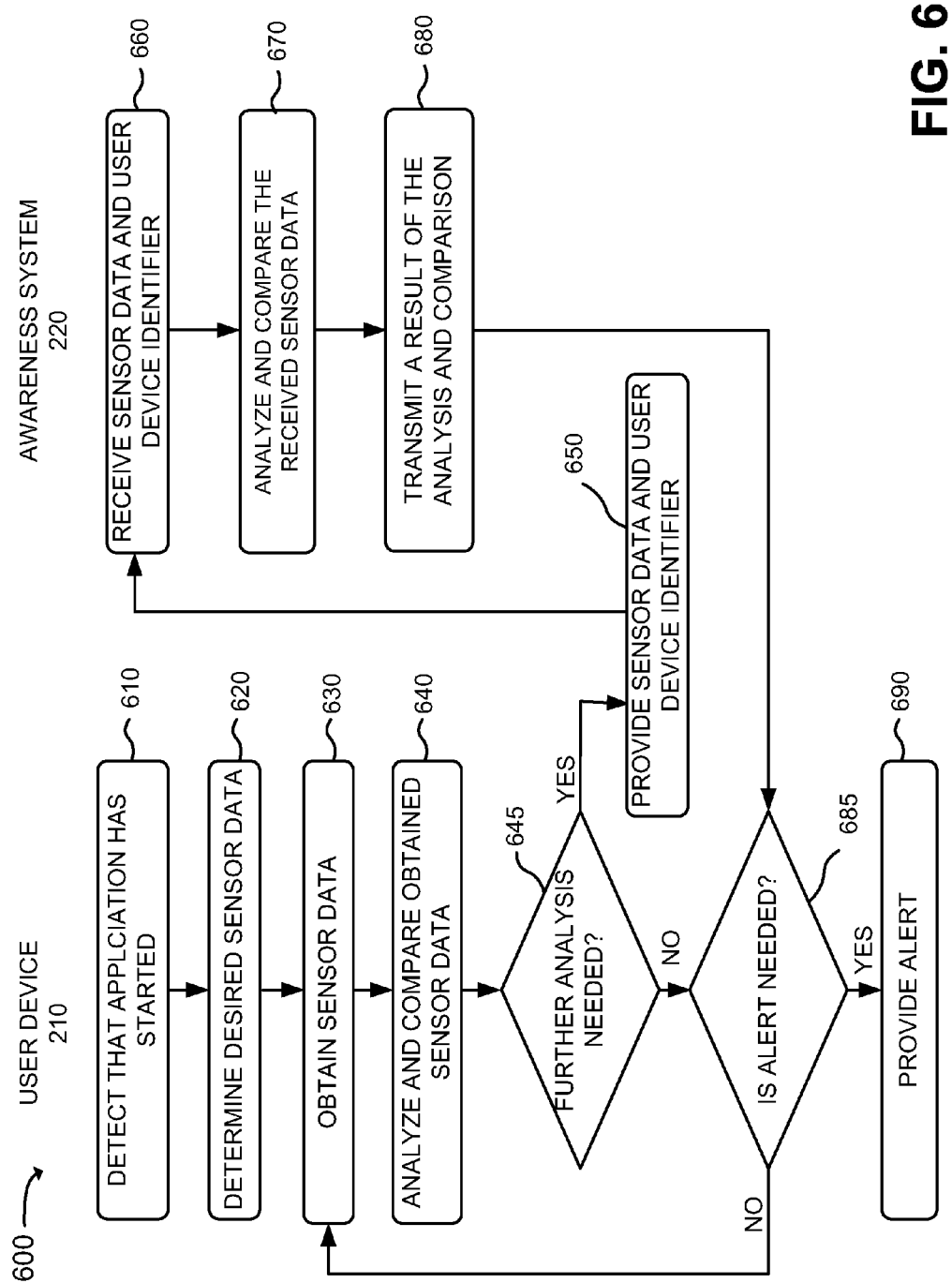
FIG. 6 is a flowchart of an example process relating to providing awareness information.

FIG. 6 is a flowchart of an example process 600 for providing awareness information to the user. While FIG. 6 shows process 600 as including a particular sequence of interactions among user device 210 and awareness system 220, in some implementations, some of the blocks of process 600 may be performed by a different device or group of devices, including or excluding user device 210 and awareness system 220.

Process 600 may include detecting that the application has started (block 610). For example, the user of user device 210 may initiate the "Surrounding Awareness" application by selecting the application via a user interface. In response, user device 210 may execute the "Surrounding Awareness" application.

Process 600 may include determining desired sensor data (block 620). For example, when "Surrounding Awareness" application turns on, user device 210 may prompt the user to identify the type or types of sensor data to be captured. In those situations where the user has specified awareness criteria and the specified awareness criteria are applicable, user device 210 may identify the type of sensor data based on the awareness criteria. For example and with reference back to FIG. 5, if user device 210 is at or near the user's house and the user turns on the "Surrounding Awareness" application, user device 210 may identify the type of sensor data as sound. In some implementations, user device 210 may identify a default type or types of sensor data.

Process 600 may include obtaining sensor data (block 630). For example, user device 210 may begin capturing the identified type or types of sensor data. In some implementations, the "Surrounding Awareness" application may cause user device 210 to obtain sensor data from one or more other devices (e.g., one or more devices that are located inside the user's house).

Process 600 may include analyzing and comparing the obtained sensor data (block 640). For example, if user device 210 detects sound and/or receives sound from the one or more other devices, the "Surrounding Awareness" application may cause user device 210 to analyze the received sound and determine if the received sound corresponds to sound included in the library of known sounds stored by user device 210. In some implementations, the library of known sounds may be supplemented with one or more media files provided by the user of user device 210. In some implementations, the application may also amplify the received sound and compare the amplified sound to the sounds in the library of known sounds.

Process 600 may include determining if further analysis of the obtained sensor data is needed (block 645). For example, if user device 210 determines, based on the comparison, that a match between the received sound and the sounds in the library of known sounds exists, user device 210 may determine that further analysis of the obtained sensor data is not needed. Assume that user device 210 compares the received sound to the sounds in the library and determines that the received sound corresponds to a media file that includes the sound of breaking glass. Based on this determination, user device 210 may determine that the received sound corresponds to breaking glass and further analysis of the received sound is not needed.

If, on the other hand, user device 210 determines, based on the comparison, that a match between the received sound and the sounds in the library does not exist, user device 210 may determine that further analysis of the obtained sensor data is needed. If further analysis is needed (block 645—YES), process 600 may include providing the obtained sensor data and the user device identifier to awareness system 220 (block 650).

Process 600 may include receiving the obtained sensor data and the user device identifier (block 660). For example, awareness system 220 may receive the obtained sensor device and user device identifier from user device 210.

Process 600 may include analyzing and comparing the received sensor data (block 670). For example, awareness system 220 may analyze the received sound (or only that part of the captured sound that includes relevant information, such as a voice) and determine if the received sound corresponds to sound included in the one or more media files provided by user device 210, the one or more other media files provided by the one or more other devices, and/or one or more media files in the library of known sounds stored by awareness system 220. In some implementations, awareness system 220 may access the library of media files and compare the received sound to sound information included in the library of media files. For example, the library of files may store sound files including, for example, a dog's bark, voice information associated with television and/or radio personalities, voice information contained in the one or media files provided by user device 210, and/or voice information contained in the one or more other media files provided by the one or more other user devices. In some implementations, awareness system 220 may use speech recognition techniques to identify the content of received speech (in those situations where the sound includes voice).

Process 600 may include transmitting a result of the comparison (block 680). In some implementations, awareness system 220 may transmit, to user device 210, information identifying the source of the sound, such as a dog's bark, the voice of a particular person, the content of a conversation, etc. In some implementations, awareness system 220 may transmit, to user device 210, information indicating that the received sensor data does not correspond to sound information in the library of media files.

Based on determining that further analysis is not needed (block 645—NO), or based on receiving the result from awareness system 220, process 600 may include determining if an alert is needed (block 685). For example, user device 210 may analyze the source of the sound and determine whether an alert is needed. To determine whether an alert is needed, user device 210 may determine, for example, whether the source of the sound may present a danger to the user. As an example, the user is outside the user's house, the sound of a bird chirping may not trigger an alert, but the sound of a door closing within the house may trigger an alert. In some situations, user device 210 may display an image of the source of the sound.

If not alert is needed (block 685—NO), process 600 may return to block 630 with user device 210 continuing to obtain sensor data.

If, on the other hand, an alert is needed (block 685—YES), process 600 may include providing an alert (block 690). For example, the application may, based on determining that an alert is needed, cause user device 210 to provide an alert. In some implementations, the alert may be a visual alert, an audible alert, a physical alert, a combination of one or more of a visual alert, an audible alert, and a physical alert, a telephone call to one or more other devices, and/or a text message to one or more other devices. In some implementations, user device 210 may identify the type of alert and provide the alert based on the stored awareness criteria.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

The following are examples of the process described above in relation to FIG. 6. As a first example, assume a user has purchased the "Surrounding Awareness" application. Assume the user arrives home and, when approaching the front door of the user's house, the user turns on the application and the application transmits information to user device 210 to cause user device 210 to provide a display that prompts the user to select a type of sensor data, and the user selects sound.

The application may begin detecting the occurrence of sound within the user's house. For example, user device 210 may include a microphone and may use the microphone to detect the occurrence of sound. Assume that user device 210 detects a voice inside the user's house. User device 210 may receive this voice and provide a visual alert and/or provide a physical alert (e.g., a vibration of user device 210). This implementation may be particularly useful for a deaf person that arrives home and wants to know if sound is detected inside the house.

In another example, assume that the user parks her car in a garage and hears a strange sound. Before exiting the car, the user may turn on the application and select sound as the type of sensor data. User device 210 may begin detecting the occurrence of sound near the user's car. User device 210 to analyze the sound and determine if the sound corresponds to sound included in the library of known sounds stored by user device 210. Assume that the sound matches a media file in the library of known sounds that corresponds to a cat's meow. Based on this match, user device 210 may determine that no alert is needed and may provide an indication that sound was detected and the cause of the sound was a cat.

In another example, assume that the user is going for a jog at night. The user may turn on the application, and user device 210 may prompt the user to select one or more types of sensor data. Assume the user will be listening to music using user device 210, and, since the user may not be able to hear all sounds that may be occurring, the user may want to be notified if a car is approaching or a dog is barking. In addition, the user may also want user device 210 to determine if a vehicle is approaching. Therefore, the user may want to be informed of the occurrence of light and sound, and the user may select light and sound as the types of sensor data.

If user device 210 detects sound and determines that the detected sound corresponds to a car engine, user device 210 may provide an alert. In addition, user device 210 may determine if the sound is increasing. If the sound is increasing, user device 210 may determine that a vehicle is approaching and provide one or more other alerts to indicate that the approaching vehicle may be a potentially dangerous situation. Therefore, user device 210 may provide a series of repeated visual, audio, and/or physical alerts to the user.

In addition, if user device 210 detects light, user device 210 may determine if a particular quantity of light and/or change in a particular quantity of light is occurring. If a particular quantity of light is determined and the light is increasing, user device 210 may determine that the light likely corresponds to the headlights of a vehicle and that the vehicle is approaching. Therefore, user device 210 may provide a series of repeated visual, audio, and/or physical alerts to the user, thereby providing the user with advance warning that the user may need to move out of the way of the approaching vehicle.

In addition to detecting the occurrence of sound within the user's house, user device 210 may instruct one or more devices located inside the user's house to also detect the occurrence of sound and transmit any detected sound to user device 210. For example, user device 210 may instruct one or more microphones inside the user's house to detect sound and transmit the detected sound to user device 210. If the one or more microphones detect the occurrence of sound, the one or more microphones may transmit the detected sound to user device 210, and the application may receive the information and determine if an alert if needed.

In some implementations, the user may select light as a type of sensor data. As an example, assume that the user arrives home, approaches the front door of the user's house, turns on the application, and selects light as the type of sensor data. User device 210 may begin detecting the occurrence of light within the user's house. For example, user device 210 may include a camera and may use the camera to detect the occurrence of light. Assume that user device 210 detects light inside the user's house. User device 210 may provide alert information to user device 210 to instruct user device 210 to emit an audible alert and/or provide a physical alert (e.g., a vibration of user device 210). This implementation may be particularly useful for a blind person that arrives home and wants to know if light is detected inside the house.

In addition to detecting the occurrence of light within the user's house, user device 210 may instruct one or more devices located inside the user's house to also detect the occurrence of light and transmit information regarding the occurrence of light to user device 210. For example, user device 210 may instruct one or more cameras inside the user's house to detect the occurrence of light and transmit information regarding the occurrence of light to user device 210. If the one or more cameras detect light, the one or more cameras may transmit the information regarding the occurrence of light to user device 210, and user device 210 may receive the information and provide an alert to the user.

In some implementations, if user device 210 detects the occurrence of sound and/or light in the user's house, user device 210 may provide instructions to one or more devices to perform one or more actions. For example, user device 210 may instruct one or more televisions in the user's house to turn on and/or may instruct one or more devices inside the house to make a sound, such as an alarm sound, to potentially scare off an intruder that may be inside the house. In some implementations, user device 210 may provide instructions to awareness system 220, which may in turn instruct the one or more devices to perform one or more actions.

In another example, assume that the user arrives home, turns on the application, selects sound as the type of sensor data, and user device 210 detects a voice from inside the user's house. User device 210 may access the audio files (e.g., which may include voice samples from family members, friends, etc.) that the user provided during registration and may determine that the detected voice does not match the one or more audio files. Therefore, user device 210 may determine that further analysis is needed and transmit the sound information to awareness system 220.

Awareness system 220 may receive the sound information and the user device identifier and compare the sound information to the library of files that may include, for example, one or more media files provided by user device 210, one or more other media files provided by the one or more other devices that are associated with user device 210 and which have been identified as being shared with the user of user device 210, and/or media files that include known voices, such as television personalities. Assume that awareness system 220 performs speech recognition on the sound information and determines that the sound information corresponds to a known television personality or the sound information is a voice that is talking about stocks.

Based on the sound information corresponding to a known television personality, awareness system 220 may determine that a match exists and may provide information indicating a match to the application. Based on the sound information including a voice that is talking about stocks, awareness system 220 may determine that the television is likely on and the sound is coming from the television. Therefore, user device 210 may determine that an alert is not needed because the user left the television on earlier in the day.

In another example, assume a relative of a blind user is in the user's house, the relative is talking on the phone, and the user has not provided user device 210 with a media file that includes a voice associated with the relative. Therefore, user device 210 may determine that sound is occurring in the user's house and the sound information does not match any received media files. Based on this determination, user device 210 may determine that further analysis is needed.

If further analysis is needed, user device 210 may instruct one or more devices inside the user's house to transmit sensor data to user device 210. For example, user device 210 may instruct one or more cameras inside the user's house to transmit visual information to user device 210, and user device 210 may transmit the visual information and the user device identifier to awareness system 220. Assume that the visual information includes an image of a person.

Based on receiving the visual information and the user device identifier, awareness system 220 may access the library of media files to determine if one or more media files in the library of media files include pictures and/or videos. As stated above, in some implementations, the user may provide one or more media files including, for example, sounds, pictures, and/or videos, to awareness system 220 and other users may also provide media files to awareness system 220, which may be shared with the user.

After accessing the library of media files associated with the user device identifier, awareness system 220 may be determine if one or more media files in the library of media files includes information that matches the visual information received from the one or more cameras. If a match exists, awareness system 220 may transmit information identifying the person to user device 210, and user device 210 may determine that no alert is needed, even though the sound information from the relative on the phone was not recognized.

In some implementations, user device 210 may communicate with one or more devices that are not located inside the user's house. For example, in addition, to providing an alert to the user, user device 210 may place a call or transmit information to one or more devices to instruct the one or more devices to place a call to an emergency responder to inform the emergency responder that sound is detected and action should be taken such as, for example, calling the police to investigate the detected sound.

In some implementations, in addition to providing one or more media files, the user may also provide contact information (e.g., one or more telephone numbers) to user device 210, and user device 210 may be configured to use this contact information to call someone in those situations when an alert is needed. Therefore, if user device 210 determines that an alert is needed, user device 210 may access the contact information and place one or more telephone calls to the one or more telephone numbers.

In some implementations, a device associated with the user's relative may also include the application. Therefore, the device associated with the user's relative may also receive alert information. In some implementations, the device associated with the user's relative may receive alert information in real-time. For example, if the device associated with the user's relative is running the application, the alert information that is provided to user device 210 may also be provided to the device associated with the user's relative.

In some implementations, the alert information provided to user device 210 and the device associated with the user's relative may be the same. In some implementations, the alert information may be different. For example, the device associated with the user's relative may receive alert information that includes information regarding the user, such as the user's name, the existence of an alert, and a suggested action. For example, if user device 210 determines that an unknown sound is occurring inside the user's house and determines that the cause of the unknown sound may be an intruder, user device 210 may determine that an alert is needed and that the user's relative should take action. Based on this determination, user device 210 may provide the alert information to the device associated with the user's relative along with information that indicates that the user's relative should take action by, for example, calling an emergency responder, calling user device 210, and/or calling one or more devices located inside the user's house.

The systems and methods described herein can be implemented in a user device that obtains sensor data, such as sound and/or light, relating to one or more conditions associated with the device. The user device may, using an application, process the obtained sensor data and provide one or more alerts, based on the obtained sensor data, to inform the user of a potentially dangerous situation.

The foregoing description provides illustration and description, but is not intended to be exhaustive or to limit the implementations to the precise form disclosed. Modifications and variations are possible in light of the above disclosure or may be acquired from practice of the implementations.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

What is claimed is:

1. A method comprising:
 receiving, by at least one of one or more devices and at a first time, sensor data, the sensor data including at least one of sound or light;
 comparing, by at least one of the one or more devices and when the sensor data includes sound, the received sound with sound information included in one or more media files,
  the one or more media files including one or more sound files provided by a user to the one or more devices at a second time,
   the one or more sound files being associated with one or more sounds that the user does not want to be associated with an alert indication, and
   the second time occurring prior to the first time;

comparing, by at least one of the one or more devices and when the sensor data includes light, the received light with one or more particular conditions;

determining, by at least one of the one or more devices and based on comparing at least one of the received sound or the received light, if alert information should be provided, the alert information indicating a dangerous situation, and the alert information not being provided when the received sound corresponds to sound in the one or more sound files; and providing, by at least one of the one or more devices and when the alert information should be provided, the alert information indicating the dangerous situation.

2. The method of claim 1, where the alert information includes at least one of:

a visual alert,
an audible alert, or
a physical alert.

3. The method of claim 1, further comprising at least one of:

providing, based on determining that the received sound does not match the sound information included in the one or more media files, the alert information; or providing, based on determining that the received light satisfies the one or more particular conditions, the alert information, the one or more particular conditions including at least one of:
a particular quantity of light, or
a change in the particular quantity of light.

4. The method of claim 1, further comprising:

providing, based on at least one of comparing the received sound with sound information included in one or more media files or comparing the received light with one or more particular conditions, an instruction to one or more other devices to perform an action, the one or more other devices being different than the one or more devices.

5. The method of claim 4, where the action includes at least one of:

turning on;
determining movement; or
determining sound.

6. The method of claim 5, further comprising:

receiving, from the one or more other devices and based on the action, data;

determining, based on the received data, if the alert information should be provided; and providing, when the alert information should be provided, the alert information.

7. The method of claim 1, where, when determining if the alert information should be provided, the method includes:

determining that additional information is needed;

transmitting, based on determining that the additional information is needed, the received sound to another device;

receiving, from the other device and based on transmitting the received sound, result information; and using the result information to determine if the alert information should be provided.

8. A device comprising:

a processor to:
receive, at a first time, sensor data,
the sensor data including at least one of sound or light;

compare, when the sensor data includes sound, the received sound with sound information included in one or more media files, the one or more media files including one or more sound files provided by a user to the device at a second time, the one or more sound files being associated with one or more sounds that the user does not want to be associated with an alert indication, and the second time occurring prior to the first time;

compare, when the sensor data includes light, the received light with one or more particular conditions;

determine, based on comparing at least one of the received sound or the received light, if alert information should be provided, the alert information not being provided when the received sound corresponds to sound in the one or more sound files; and provide, when the alert information should be provided, the alert information.

9. The device of claim 8, where the alert information includes at least one of:

a visual alert,
an audible alert, or
a physical alert.

10. The device of claim 8, where the processor is further to at least one of:

provide, based on determining that the received sound does not match the sound information included in the one or more media files, the alert information; or provide, based on determining that the received light satisfies the one or more particular conditions, the alert information, the one or more particular conditions including at least one of:
a particular quantity of light, or
a change in the particular quantity of light.

11. The device of claim 8, where the processor is further to:

provide, based on at least one of comparing the received sound with sound information included in one or more media files or comparing the received light with one or more particular conditions, an instruction to one or more other devices to perform an action, the one or more other devices being different than the device.

12. The device of claim 11, where the action includes at least one of:

turning on;
determining movement; or
determining sound.

13. The device of claim 12, where the processor is further to:

receive, from the one or more other devices and based on the action, data;

determine, based on the received data, if the alert information should be provided; and provide, when the alert information should be provided, the alert information.

14. The device of claim 8, where the processor, when determining if the alert information should be provided, is further to:

determine that additional information is needed;

transmit, based on determining that the additional information is needed, the received sound to another device;

receive, from the other device and based on transmitting the received sound, result information; and use the result information to determine if the alert information should be provided.

15. A non-transitory computer-readable medium for storing instructions, the instructions comprising:
one or more instructions, which, when executed by a processor of a wireless device, cause the processor to:
receive, at a first time, an instruction from a user of the wireless device;
capture, based on the received instruction, at least one of sound or light in a vicinity of the wireless device;
determine that the captured at least one of sound or light matches a danger criterion, the danger criterion relating to a potentially dangerous situation, and
the one or more instructions to determine that the captured at least one of the sound or the light matches the danger criterion including:
one or more instructions to compare the captured sound to one or more sound files provided by the user to the wireless device at a second time,
the one or more sound files being associated with one or more sounds that the user does not want to be associated with an alert indication, and
the second time occurring prior to the first time; and
alert the user based on the determination, the user not being alerted when the captured sound corresponds to sound in the one or more sound files.

16. The non-transitory computer-readable medium of claim 15, where the one or more instructions to cause the processor to alert the user include at least one of:
one or more instructions to provide a visual alert, one or more instructions to provide an audible alert, or one or more instructions to provide a physical alert.

17. The non-transitory computer-readable medium of claim 15, where the one or more instructions to capture at least one of sound or light in the vicinity of the wireless device are further to cause the processor to:
determine that the captured sound does not correspond to sound in the one or more sound files provided by the user; and
provide, based on determining that the captured sound does not correspond to sound in the one or more sound files provided by the user, the alert and information regarding a potential source of the captured sound.

18. The non-transitory computer-readable medium of claim 15, where the one or more instructions to capture at least one of sound or light in the vicinity of the wireless device are further to cause the processor to:
determine that the captured light satisfies one or more particular conditions, the one or more particular conditions including at least one of: a particular quantity of light, or a change in the particular quantity of light; and
provide, based on determining that the captured light satisfies the one or more particular conditions, the alert and information regarding a potential source of the captured light.

19. The non-transitory computer-readable medium of claim 15, where the one or more instructions to capture at least one of sound or light in the vicinity of the wireless device are further to cause the processor to:
capture sound in the vicinity of the wireless device; amplify the captured sound; determine that the amplified sound matches the danger criterion.

20. The non-transitory computer-readable medium of claim 15, where the one or more instructions are further to cause the processor to:
provide, based on the captured at least one of sound or light in the vicinity of the wireless device, an instruction to one or more other devices to perform an action,
the one or more other devices being different than the wireless device and the action including at least one of: turning on; determining movement; or determining sound;
receive, from the one or more other devices and based on the action, data;
determine, based on the received data, that the received data matches the danger criterion; and
alert the user based on determining that the received data matches the danger criterion.

* * * * *